United States Patent [19]
Hartmann

[11] Patent Number: 5,196,181
[45] Date of Patent: Mar. 23, 1993

[54] PROCESS FOR THE PRODUCTION OF TITANIUM DIOXIDE

[75] Inventor: Achim Hartmann, Pulheim, Fed. Rep. of Germany

[73] Assignee: Kronos (USA), Inc., Hightstown, N.J.

[21] Appl. No.: 610,126

[22] Filed: Nov. 7, 1990

[30] Foreign Application Priority Data

Nov. 13, 1989 [EP] European Pat. Off. ........ 89120996.7

[51] Int. Cl.$^5$ ............................................. C01G 23/04
[52] U.S. Cl. ..................................... 423/613; 106/437
[58] Field of Search ........................ 423/613; 106/437; 422/158

[56] References Cited

U.S. PATENT DOCUMENTS

| | | | |
|---|---|---|---|
| 2,760,846 | 8/1956 | Richmond et al. | 423/614 |
| 3,391,998 | 7/1968 | Groves et al. | 422/158 |
| 3,449,076 | 6/1969 | Monroe, Jr. | 423/613 |
| 3,493,342 | 2/1970 | Weaver et al. | 423/613 |
| 3,582,278 | 6/1971 | Kulling et al. | 423/613 |
| 3,735,000 | 5/1973 | Calcagno | 423/613 |
| 3,914,396 | 10/1975 | Bedetti et al. | 423/613 |
| 4,170,630 | 10/1979 | Hoelscher | 423/613 |
| 4,214,913 | 7/1980 | Glaeser | 423/613 |

FOREIGN PATENT DOCUMENTS 1043982 12/1978 Canada .
2037990 3/1971 Fed. Rep. of Germany .

*Primary Examiner*—Michael Lewis
*Assistant Examiner*—Steven Bos
*Attorney, Agent, or Firm*—Evenson, Wands, Edwards, Lenahan & McKeown

[57] ABSTRACT

A process for the production of titanium dioxide through the reaction of vaporous TiCl$_4$ with oxygen under a pressure of between 2.4 and 3.4 bar, and a corresponding apparatus are used to achieve long permanent operation times. The oxygen required is indirectly preheated to between 850° and 1000° C. In a reaction chamber closed at one end, configured inside for advantageous flow and lined at least partly with refractories, the indirectly preheated oxygen is further heated by direct contact with very hot combustion gases of an auxiliary flame to temperatures, as is required, for the spontaneous reaction with the TiCl$_4$ introduced downstream into the reaction chamber. Through an annular passage in the inner peripheral wall of the reaction chamber directly at its front wall, the indirectly preheated oxygen enters the chamber uniformly distributed over its circumference, and the oxygen flow is controlled to obtain a Reynolds' number of between 15,000 and 20,000 in the annular passage and to obtain a ratio of Reynolds' number to inner diameter, in millimeters, of the reaction chamber of between 25 and 50 to 1.

9 Claims, 1 Drawing Sheet

PROCESS FOR THE PRODUCTION OF TITANIUM DIOXIDE

BACKGROUND AND SUMMARY OF THE INVENTION

The present invention relates to a process and apparatus for the production of titanium dioxide through the reaction of vaporous TiCl₄ and, optionally, smaller amounts of other vaporous metal halides with oxygen under pressure.

In such a process, the mixture of TiCl₄ and oxygen must have a temperature of at least about 1000° C. in the reaction zone in order to have the oxidation take place spontaneously and completely. This can be achieved, for instance, by heating one or both reaction constituents or partners to a degree that they form a correspondingly hot mixture when being mixed and by uniting them in the reaction zone. It has been suggested, for instance in U.S. Pat. No. 3,449,076, first to preheat oxygen to a temperature of 800–1300° C. in a heat exchanger and then to further preheat it to 1800° C. in the preheating zone of a reaction chamber by direct contact with hot gases generated in the combustion of a liquid hydrocarbon, e.g., toluene, in order that, on subsequent mixing in the reaction zone with the TiCl₄ heated to about 450° C., a gas mixture is formed having the temperature required for a spontaneous reaction to TiO₂.

In this known process, owing to the combustion of the liquid hydrocarbon in the reaction chamber, temperatures of 2500–3000° C. are incurred locally which require the reaction chamber to be lined with ceramic refractory material at least in the area in which the combustion takes place, since a water cooling of the chamber walls entails serious disadvantages. Nevertheless, the thermal load is often still so high that the refractory lining is destroyed relatively quickly to an extent that only an insufficiently short operation is feasible with such a combustion chamber. The lining then has to be renewed with consequent lengthy and expensive repairs.

It has also been suggested in DE-A-20 37 990 to protect the ceramic refractory walls inside a reaction chamber for the vapor-phase oxidation of titanium tetrachloride from attack by the hot preheating gases by introducing the oxygen into the combustion chamber at a temperature of only slightly above room temperature and by assuring that the oxygen forms a protective film on the inner wall of the reaction chamber in the area of the auxiliary flame, i.e., the flame of the preheating combustible fuel. The disadvantage of this approach is that the preheating fuel combustion has to supply an essentially greater quantity of heat to the reaction of the mixture of TiCl₄ and oxygen. A larger amount of combustible fuel is required therefor. Today, hydrocarbons are the commonly used fuels for such a combustion process since these fuels are relatively easy to handle. The water generated in the combustion of the hydrocarbons is reacted to HCl, i.e., it binds a corresponding amount of chlorine which is thus no longer available for the chlorination of fresh titaniferous material. This also means that the higher the amount of fuel to be used in the combustion process, the higher is the loss of chlorine. Moreover, off-gas cleaning becomes more difficult when large amounts of HCl gas are contained in the off-gas. Although it is possible to produce hydrochloric acid from the HCl scrubbed out from the off-gas, this hydrochloric acid is difficult to sell, and the sale proceeds offset only a small portion of the costs incurred.

An object of the present invention is, therefore, to provide a process and an apparatus for the production of titanium dioxide by the vapor-phase oxidation of TiCl₄ with oxygen, in which the process and apparatus require only a small quantity of combustible fuel for the auxiliary flame and ensure a long service life of the reaction chamber without necessitating intermediate repairs of the ceramic refractory chamber walls.

This object has been achieved in accordance with the present invention by a process for the production of titanium dioxide through the reaction of vaporous TiCl₄ and, optionally, small amounts of other vaporous metal halides with oxygen under a pressure of between 2.4–3.4 bar, in which the oxygen required for the reaction is preheated indirectly to a temperature of between 850 and 1000° C. A reaction chamber is employed which is closed at one end and has a preheating zone which extends from the closed end and is followed by a reaction zone. The reaction chamber is essentially radially symmetrical inside around its longitudinal axis, and the inner chamber walls consist of ceramic refractory material at least in the preheating zone. The closed end of the reaction chamber is configured to achieve an almost planar surface inside the chamber, the chamber having no step-like changes in its inner diameter at least in the preheating zone.

Another feature of the process is that the indirectly preheated oxygen is introduced into the reaction chamber immediately at its closed end and is uniformly distributed over the entire circumference of the preheating zone via an annular passage in the inner peripheral wall of the chamber such that the oxygen flow in the annular passage is characterized by a Reynolds' number between 15,000 and 20,000 and the ratio of this Reynolds' number to the inner diameter, in millimeters, of the preheating zone at the annular passage is between 25 and 50 to 1. The oxygen introduced is further heated in the preheating zone through the combustion of a gaseous and/or a liquid combustible fuel and through direct contact with the hot combustion gases, to a temperature sufficient for an essentially complete oxidation of all metal halides to be achieved, and is reacted thereafter in the reaction zone with the TiCl₄ fed therein and with the other optionally used metal halides. The resultant titanium dioxide is then isolated.

In carrying out the process of the present invention, the oxygen preheated to 850 to 1000° C. produces an excellent protective film along the inner walls of the reaction chamber, in particular in the preheating zone, not only along the peripheral wall but also at the front wall of the closed end. This oxygen film reliably protects the ceramic refractory lining of the preheating zone, especially around the auxiliary flame for further heating the oxygen, against the prevailing high temperatures. The process according to the present invention thereby achieves a service life 10 to 70 times longer than was feasible with the use of a reaction chamber with different oxygen flow and without intermediate renewal of the ceramic refractory lining of the reaction chamber.

Such protective effect of the hot-oxygen film is unexpected, since a gas film normally forms a protective barrier to hot gases only if the temperature of the protective gas film is very low so that there is a rather great difference in the viscosity and density of the two gases, with the effect that it is difficult for the gases to penetrate each other and their mixing with each other is delayed.

In the process according to the present invention, the oxygen required for the oxidation of the titanium tetrachloride is indirectly preheated to 850–1000° C., without mixing or reaction with the heating medium, prior to being fed into the reaction chamber. A preheating temperature as high as possible is preferred in order to keep the amount of combustible fuel required in the preheating zone of the reaction chamber as low as possible.

It must be ensured, of course, that even in permanent operation no corrosion, scale formation or other chemical reaction will damage the material of the apparatus for the indirect preheating of the oxygen or the conduits in which the preheated oxygen is conveyed to the reaction chamber.

It is also favorable to indirectly preheat so far as possible the stream of titanium tetrachloride prior to feeding it into the oxidation zone of the reaction chamber. The oxygen and the titanium tetrachloride can be indirectly preheated, for instance, by passing the gases through gas-fired coil-tube heat exchangers. Using alloys known to be highly heat and corrosion resistant, the oxygen can be preheated this way up to about 1100° C. and the titanium tetrachloride up to about 500° C. The oxygen then is to be further heated in the preheating zone of the reaction chamber in order that the mixture of oxygen and $TiCl_4$ in the reaction zone attains the starting temperature of about 1000° C required for the spontaneous reaction. Since a complete reaction of the $TiCl_4$ to produce titanium dioxide is known to require excess oxygen, it is sufficient to preheat the oxygen in the preheating zone to about 1500–1650° C., with the titanium tetrachloride being preheated, for example, to about 450° C., in order to ensure the above-mentioned $TiO_2$-producing minimum reaction temperature. For this purpose, the indirectly preheated oxygen is fed into the preheating zone of the reaction chamber and therein directly contacted with the hot combustion gases generated in the combustion of a liquid and/or a gaseous fuel.

Particularly suitable combustible fuels are gaseous or liquid hydrocarbons which, optionally with additional oxygen, are injected through an atomizer nozzle into the preheating zone of the reaction chamber and, if necessary, ignited. The hydrocarbons should have a rather low hydrogen-to-carbon ratio. A suitable hydrocarbon fuel is toluene with which a combustion gas temperature of 2500 to 3000° C. can be achieved. It is to be understood that the process of this invention can also be run with other fuels such as, for instance, carbon monoxide.

An essential agent of the present invention is the introduction of oxygen into the preheating zone of the reaction chamber to produce therein a uniform protective film along the endangered inner walls of the chamber. This requires a specially configured reaction chamber which is essentially radially symmetrical inside and around its longitudinal axis. The reaction chamber, at least in the preheating zone, must not have step-like changes of its inner diameter, and thus must not display abrupt changes in its inner diameter, i.e., no changes over a very short distance in the axial direction of the reaction chamber where the protective oxygen film would break away from the inner wall and/or would be whirled about. The inner diameter of the reaction chamber need not remain constant, however, but may change gradually. The interior of the preheating zone may comprise, for example, truncated-cone-shaped sections. In addition, the reaction chamber must be configured at its closed end to produce an almost planar inner wall.

The indirectly preheated oxygen is introduced into the reaction chamber immediately at its closed end via an annular passage in the peripheral wall of the chamber. This is advantageously achieved, for example, by introducing the oxygen into the preheating zone via an annular passage between the refractory inner lining of the peripheral wall and that of the front wall of the reaction chamber. The flow of the oxygen in the annular passage has a Reynolds' number of within 15,000 and 20,000. These values relate to a pressure within the chamber of 2.4–3.4 bar, (i.e., 1.4–2.4 bar overpressure). Since, as a rule, the $TiO_2$ yield in a reaction chamber is given, and therefore also the oxygen required per unit of time is defined, it is most advantageous to adjust the Reynolds' number of the flow of oxygen in the annular passage by choosing a suitable passage width.

Finally, a critical factor in the process of the present invention is the relation between the flow of the hot oxygen in the annular passage and the internal diameter of the preheating zone at the annular passage. The ratio between the Reynolds' number, which characterizes the hot oxygen flow in the annular passage, and the internal diameter, in millimeters, of the preheating zone at the annular passage is within 25 and 50 to 1.

The process of the invention is particularly suitable for the production of titanium dioxide pigments. In addition to the vaporous titanium tetrachloride, small amounts of other vaporous metal halides, e.g., $AlCl_3$, $ZrCl_4$, may conventionally be added to the reaction mixture to achieve in a known way certain desired pigment properties. Such metal halides may for instance be fed into the reaction zone in admixture with the titanium tetrachloride stream.

In a particularly advantageous embodiment of the process of the present invention, the titanium dioxide generated is isolated by cooling down the suspension of titanium dioxide and gases formed in the reaction chamber, separating the titanium dioxide from these gases in a bag filter plant and removing the titanium dioxide from the bag filter plant. A known bag filter plant contains in a casing several bag filters through which the gas suspension is passed. After certain intervals, one or several of the bags are cleaned from the adhering $TiO_2$ by passing a purge gas through them in opposite direction. The $TiO_2$ is then discharged through an airlock.

With increasing time of operation of such a filter plant in the production of $TiO_2$, the mean pressure drop in the filter plant slowly rises. The reason for the rise of drop is that the suspension of $TiO_2$ and gas still contains small amounts of unreacted $TiCl_4$ or metal halides which, on passing through the filter plant, partly conglutinate and thus plug the fabric of the filter bags and/or a $TiO_2$ layer deposited on the fabric. Such a filter plant can be operated properly only up to a maximum pressure drop in the filter plant. When this limit is reached, the filter has to be disassembled and cleaned. This normally involves several hours downtime of a production plant.

Unexpectedly, it was found that the process of the present invention considerably retards the plugging of the filter bags so that the periods after which the bag filter plant has to be cleaned may be at least twice as long as previously. In addition to the time savings, the present invention provides significant savings in material since the filter bags made of expensive corrosion-resistant material are often so severely damaged in the necessary cleaning operation that they need to be replaced by new bags after about four operating periods of the filter bag plant.

Another object of the present invention is the use of an apparatus for the production of titanium dioxide through the reaction of vaporous TiCl$_4$ and optionally smaller amount of other vaporous metal halides with oxygen under a pressure of within 2.4 and 3.4 bar. The device comprises a reaction chamber which is essentially radially symmetrical inside around its longitudinal axis and closed at one front wall so as to achieve an almost planar front wall inside the chamber. The reaction chamber comprises an oxygen preheating zone extending from the closed end of the chamber, followed by a reaction zone. The reaction zone has inlets for introducing the vaporous titanium tetrachloride and optionally other metal halides, and the preheating zone has a facility for the introduction and combustion of a gaseous and/or a liquid combustible fuel.

The interior walls at least of the preheating zone of the chamber consist of or are lined with refractory material. The preheating zone is devoid of step-like changes of its inner diameter and has an annular passage which is formed by the refractory material of the peripheral wall and that of the front wall of the preheating zone and into which runs a conduit with several inlets for feeding oxygen of 800–1000° C. temperature. The conduit is connected at its other end with a facility for indirectly preheating the oxygen to that temperature.

The annular passage has a width sufficient to permit the oxygen of 850–1000° C. to flow through at a flow characterized by a Reynolds' number between 15,000 and 20,000. The preheating zone at the annular passage has a diameter such that the ratio between the Reynolds' number characterizing the oxygen flow in the annular passage, and this diameter, in millimeters, is within 25 and 50 to 1. The reaction zone can of course be composed of several parts. Their inner diameters must range between 300 and 800 mm.

The refractory lining may consist of one or several concentric layers of a ceramic material. A preferred material is an oxide ceramic. It is particularly advantageous to have at least the innermost layer of the lining delimiting the interior of the reaction chamber consist essentially of aluminum oxide. The ceramic lining may consist, for instance, of a correspondingly sintered tamped material.

Since a good reaction of titanium tetrachloride with oxygen in the reaction zone requires a quick and uniform mixing of both gases, it is advantageous for the reaction zone to have a relatively small inner diameter, while the preheating zone of the reaction chamber should rather have a larger diameter because of the heat load prevailing therein. In a particularly advantageous embodiment of the device of the present invention, therefore, the interior of the reaction chamber at the end of the preheating zone conically tapers to the diameter of the reaction zone which has radial inlets for the titanium tetrachloride. The reaction zone may be configured, for instance, as described in DE-B-15 92 529.

A further embodiment of the device of the present invention connects the reaction chamber, optionally via an intermediate piece, to a heat exchanger for the cooling of the suspension formed of titanium dioxide and gases, and the heat exchanger is connected to a bag filter plant for the separation of the titanium dioxide from the gases. An intermediate piece between the reaction chamber and the heat exchanger may be required, for instance, if certain substances are to be added to the mixture formed in the reaction zone, such as scrub solids to keep the interior walls of the down-stream heat exchanger free from deposits.

BRIEF DESCRIPTION OF THE DRAWINGS

These and other objects, features and advantages of the present invention will become more apparent from the following detailed description of a presently preferred embodiment of the present invention when taken in conjunction with the accompanying example and drawings wherein.

DETAILED DESCRIPTION OF THE DRAWINGS

Figure 1A:
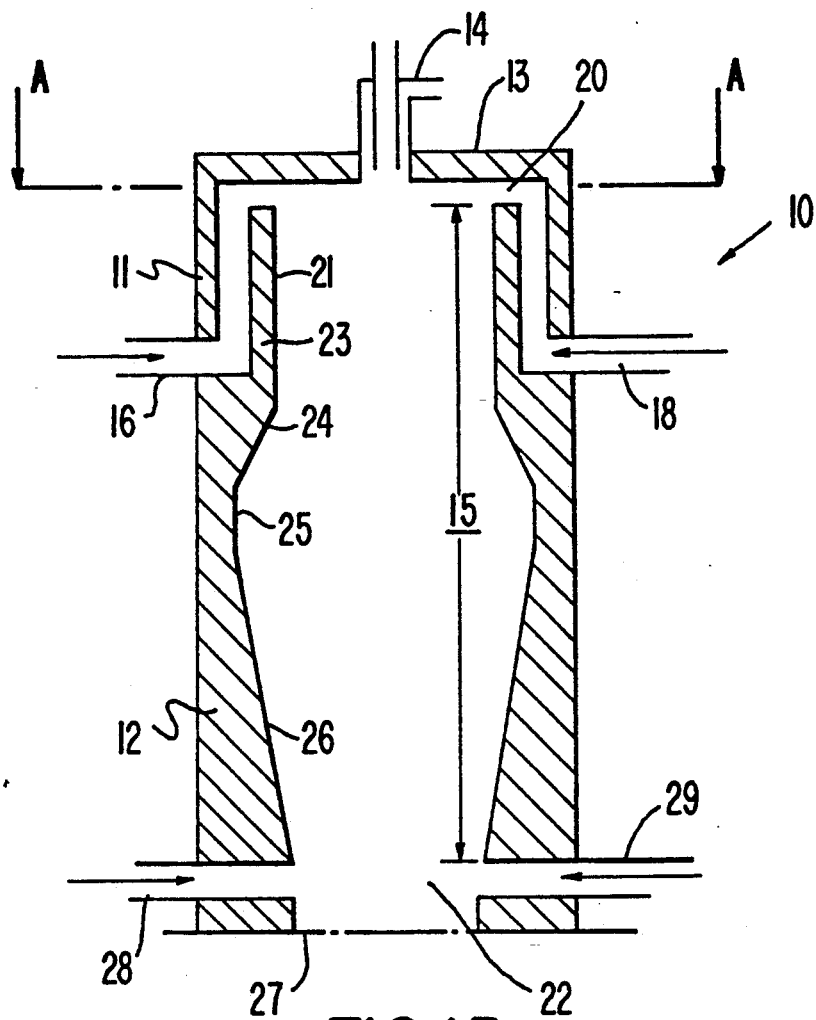
FIG. 1A schematically shows in elevational cross-section an embodiment of a reaction chamber according to the present invention.

The reaction chamber shown in FIG. 1A is designated generally by the number 10 and has a metal jacket 11 lined inside with refractory ceramic material. The reaction chamber 10 is closed at one front wall 13, the interior front wall 13 of the chamber 10 forming an almost planar surface. A burner 14 is provided in the center of this front wall 13 in an axial direction for further heating the oxygen in a preheating zone 15. The indirectly preheated oxygen is introduced through four inlets 16, 17, 18, 19 into an annular passage 20 formed by the inner part 21 of the refractory lining 12 of the peripheral wall of the chamber 10 and by the refractory lining of the front wall 13, and, through passage 20, enters the reaction chamber. The inner diameter 23 of the chamber 10 in the preheating zone 15 is at first constant, then gradually increases at 24 and remains constant again at 25; the preheating zone 15 then tapers at 26 towards its end 27, its diameter decreasing to that of the reaction zone 22 wherein there are several inlets 28, 29 for titanium tetrachloride, arranged radially on the peripheral wall 12. The invention is now illustrated more fully by way of an example:

EXAMPLE 1

(Comparative Example)

In a plant for the production of rutile TiO$_2$ pigment, a mixture of TiCl$_4$ and AlCl$_3$ at an approximate molar ratio of 30:1 was reacted with oxygen at a pressure of about 2.9 bar, the resulting suspension of titanium dioxide particles (particle size about 0.4–0.7 microns) and gases was cooled down in a heat exchanger and the solids were separated from the gas in a bag filter plant.

The reaction chamber used was refractory-lined in the preheating zone with a double layer of 180 mm total thickness of insulating bricks and on top of them a tamped corundum material. At one end, the reaction chamber was closed with a lid which was also lined inside as described above. The preheating zone over its first 530 mm, starting from the ceramic lining of the lid, had a constant inner diameter of 640 mm. In the center of the lid, an atomizing nozzle was installed axially through which 90 l/h of toluene and 170 m$^3$ N/h oxygen were fed which, after ignition, reacted with each other, thereby developing combustion gases of 2500°–2700° C. Oxygen was passed through a gas-fired coil-tube heat exchanger wherein it was preheated to 950° C.; 1610 m³ N/h of this preheated oxygen were fed into the chamber roughly 300 mm away from the ceramic refractory lining of the lid of the combustion chamber, by blowing it radially through four inlets distributed over the circumference of the reaction chamber, into the hot combustion gases of the burner, the flow rate at the entry into the combustion chamber being about 102 m/sec. The hot gas mixture passed axially through the preheating zone, the oxygen being heated to about 1600° C. In the subsequent reaction zone, 12.5 t/h of the TiCl$_4$ and AlCl$_3$ mixture preheated to about 450° C. were blown radially into the hot gas stream and reacted with the oxygen.

After only 300 operating hours, the entire tamped corundum lining of the lid was severely fused together, its wall thickness markedly decreasing towards the burner nozzle. Part of the missing tamped lining material was found as fused material in the lower part of the preheating zone. The interior ceramic lining of the peripheral wall of the chamber also showed marked fusing of the refractory. This part of the reaction chamber and the lid therefor had to be newly lined with refractory material after each above-mentioned operating period.

EXAMPLE 2

Figure 1B:
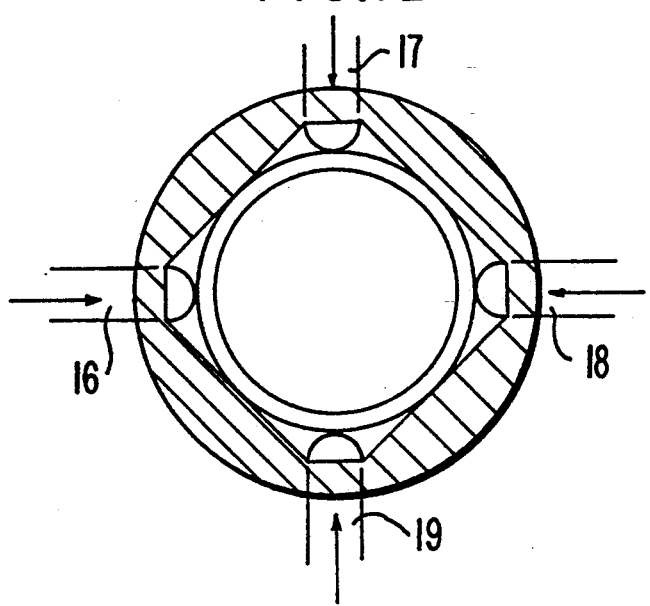
FIG. 1B is a cross-sectional view taken along line A—A of FIG. 1A.

The operation in this example was identical to that in the preceding comparative example. Before beginning, however, the ceramic lining of the reaction chamber was modified according to FIGS. 1A and 1B. In particular, the corundum lining of the chamber was now constructed such that the inner diameter of the reaction chamber, seen in the direction toward the lid and beginning 530 mm before the ceramic lining of the lid, continuously decreased from 640 mm to 480 mm over a distance of 200 mm, then followed a section of 300 mm length of the same inner diameter. The corundum lining of the sidewalls of the chamber ended 30 mm ahead of the ceramic lining of the lid so that an annular passage of 30 mm width was formed there. From the four inlets for the hot oxygen, around the chamber, semicircular ducts of 60 mm radius reached into the corundum material up to the annular passage. The hot oxygen of 950° C. passed through the four inlets at a rate of 101 m/sec and came out of the annular passage into the interior of the chamber at a flow rate of 17.7 m/sec. The Reynolds' number of the oxygen stream in the annular passage was 15,990. The ratio of this Reynolds' number to the inner diameter of the preheating zone at the annular passage was 33.3. Even after 9000 operating hours this combustion chamber showed no damage of the ceramic lining in the preheating zone which, on the contrary, was in perfect condition.

For the bag filter plant used in the examples, the maximum admissible pressure drop at the filter was 80 mbar. In Example 1, this limit was reached after 52 days of operation, a filter cleaning thus being required. In proceeding according to the present invention, as described in Example 2, the pressure drop at the filter was only about 40 mbar after this period with all other conditions being the same. The filter was cleaned only after 92 days; the pressure drop at the filter then was no more than 60 mbar. An analysis for unreacted TiCl$_4$ and AlCl$_3$ (Ti$_{solub.}$, Al$_{solub.}$) in the off-gas showed the following results:

| | Example 1 | Example 2 |
|---|---|---|
| Ti$_{solub.}$(mg/m³N) | 2.5 | 0.38 |
| Al$_{solub.}$(mg/m³N) | 0.17 | 0.07 |

It can be seen that, in the process of the present invention, the contents of unoxidized TiCl$_4$ and AlCl$_3$ in the off-gas is essentially lower. A more comprehensive oxidation thus has taken place in the reaction chamber.

The object of the invention thus is a process and apparatus for the production of titanium dioxide through the reaction of vaporous TiCl$_4$ with oxygen under a pressure of between 2.4 and 3.4 bar. The oxygen required is indirectly preheated to between 850 and 1000° C. In a reaction chamber closed at one end, designed inside for advantageous flow and lined at least partly with refractory material, the preheated oxygen is first further heated by direct contact with very hot combustion gases of an auxiliary flame to a temperature, as is required, for the spontaneous reaction with the TiCl$_4$ introduced downstream into the reaction chamber. Through an annular passage in the inner peripheral wall of the reaction chamber directly at its front wall, the indirectly preheated oxygen enters the chamber uniformly distributed over its circumference, an the oxygen flow is controlled so as to obtain a Reynolds' number of between 15,000 and 20,000 in the annular passage and to obtain a ratio of Reynolds' number to inner diameter, in millimeters, of the reaction chamber of between 25 and 50 to 1. Long permanent operation times are thus achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for production of titanium dioxide through reaction of at least vaporous TiCl$_4$ with oxygen in a radially symmetrical reaction chamber closed at one end and having a preheating zone which extends from the closed end and followed by a reaction zone, comprising the steps of:
   (a) indirectly preheating the oxygen required for the reaction;
   (b) introducing the indirectly preheated oxygen into the reaction chamber immediately adjacent its closed end;
   (c) uniformly distributing the oxygen over the entire circumference of the preheating zone via annular passages in the interior peripheral wall of the chamber such that the flow of oxygen through each of the annular passages is characterized by a Reynolds' number between 15,000 and 20,000 to produce cooling of the preheating chamber with a protective oxygen film;
   (d) further heating the oxygen introduced in the preheating zone through the combustion of a gaseous and/or a liquid combustible fuel and through direct contact with the hot combustion gases, to a temperature sufficient for an essentially complete oxidation of all metal halides and thereafter reacting the heated oxygen in the reaction zone with the at least TiCl$_4$ fed therein; and
   (e) isolating the resultant titanium dioxide.

2. Process according to claim 1, wherein the step of isolating the resultant titanium dioxide comprises cooling down the suspension of titanium dioxide and gases formed in the reaction chamber, separating the titanium dioxide from these gases in a bag filter plant, and removing the titanium dioxide from the bag filter plant.

3. Process according to claim 1, wherein the step of indirectly preheating the oxygen takes place until a temperature of the oxygen is between 850° and 1000° C., the step of introducing the preheated oxygen into the reaction chamber includes introducing the oxygen through the annular passages in the interior peripheral wall of the preheating zone to establish a flow having a Reynolds' number between about 15,000 and 20,000 and a ratio of the Reynolds' number to an inner diameter of the preheating zone, as measured in millimeters at the annular passage, of between 25:1 and 50:1, and the step of further heating the oxygen to react the heated oxygen is carried out at a pressure between about 2.4 and 3.4 bar.

4. Process according to claim 1, wherein the step of indirectly preheating takes place until a temperature of the oxygen is between 850° and 1000° C.

5. Process according to claim 1, wherein the step of further heating the oxygen is carried out at a pressure between about 2.4 and 3.4 bar.

6. Process for the production of titanium dioxide through the reaction of at least vaporous $TiCl_4$ with oxygen under pressure in a reaction chamber having an inner diameter devoid of abrupt changes at least in a preheating zone, comprising the steps of:
   (a) indirectly preheating the oxygen required for the reaction;
   (b) introducing the indirectly preheated oxygen into the reaction chamber through passages so as to uniformly distribute the oxygen over an entire circumference of the preheating zone such that the flow of the oxygen through each of the passages is characterized by a Reynolds' number between about 15,000 and 20,000; and
   (c) further heating the oxygen introduced in the preheating zone through the combustion of a gaseous and/or a liquid combustible fuel and through direct contact with the hot combustion gases, to a temperature sufficient for an essentially complete oxidation of metal halides present and therafter reacting the heated oxygen in the reaction zone with the at least $TiCl_4$ fed therein.

7. Process according to claim 6, further including the step of isolating the resultant titanium dioxide which comprises cooling down the suspension of titanium dioxide and gases formed in the reaction chamber, separating the titanium dioxide from the gases in a bag filter plant and removing the titanium dioxide from the bag filter plant.

8. Process according to claim 6, wherein additional vaporous metal halides are reacted simultaneously with the $TiCl_4$.

9. Process according to claim 6, wherein the pressure is between about 2.4 and 3.4 bar.

* * * * *